Figure 1:
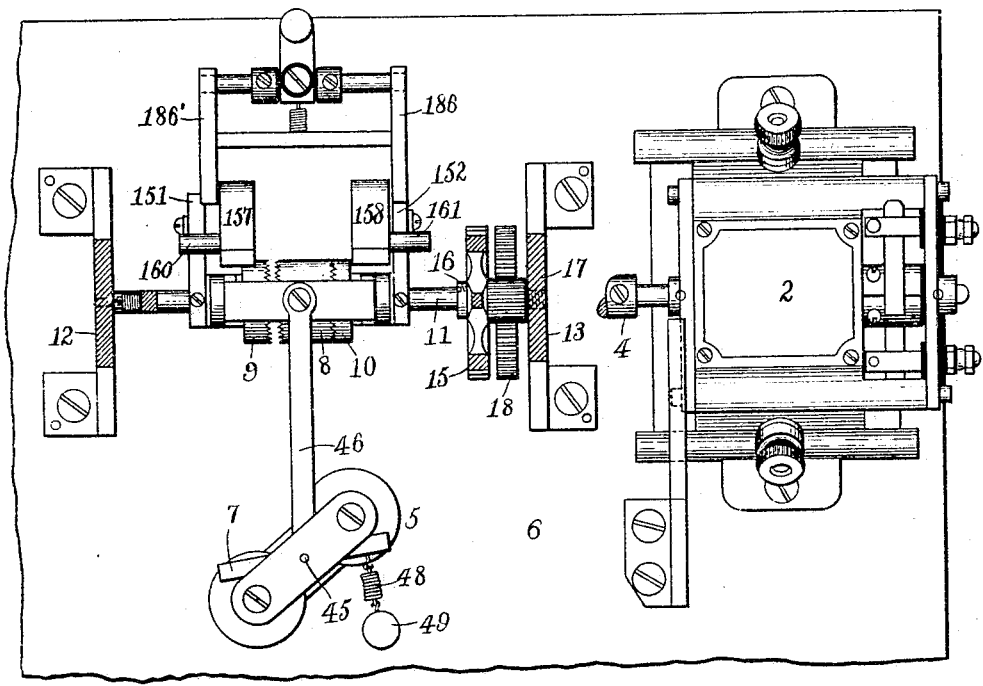

No. 766,474. PATENTED AUG. 2, 1904.
C. R. UNDERHILL.
RECEIVING TELEGRAPH INSTRUMENT.
APPLICATION FILED JUNE 1, 1903.
NO MODEL. 7 SHEETS—SHEET 1.

WITNESSES:
C. Champion
Milton B. Kolb

INVENTOR
Charles R. Underhill
BY C. Champion
ATTORNEY

No. 766,474. PATENTED AUG. 2, 1904.
C. R. UNDERHILL.
RECEIVING TELEGRAPH INSTRUMENT.
APPLICATION FILED JUNE 1, 1903.
NO MODEL. 7 SHEETS—SHEET 2.

WITNESSES:
R. Champion
Milton B. Kolb

INVENTOR
Charles R. Underhill
BY
ATTORNEY

No. 766,474. PATENTED AUG. 2, 1904.
C. R. UNDERHILL.
RECEIVING TELEGRAPH INSTRUMENT.
APPLICATION FILED JUNE 1, 1903.
NO MODEL. 7 SHEETS—SHEET 3.

WITNESSES:

INVENTOR
Charles R. Underhill
BY
ATTORNEY

No. 766,474. PATENTED AUG. 2, 1904.
C. R. UNDERHILL.
RECEIVING TELEGRAPH INSTRUMENT.
APPLICATION FILED JUNE 1, 1903.

NO MODEL. 7 SHEETS—SHEET 4.

WITNESSES:
R. Champion
Milton B. Kolb

INVENTOR
Charles R. Underhill
BY
[signature]
ATTORNEY

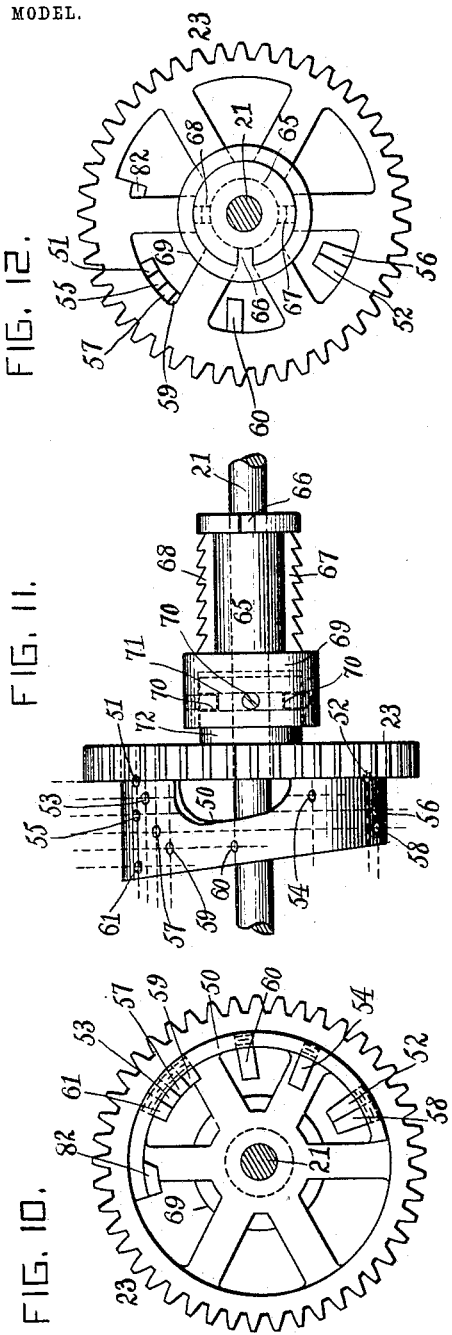

No. 766,474. PATENTED AUG. 2, 1904.
C. R. UNDERHILL.
RECEIVING TELEGRAPH INSTRUMENT.
APPLICATION FILED JUNE 1, 1903.
NO MODEL. 7 SHEETS—SHEET 6.

WITNESSES:
R. Champion
Milton B. Kolb

INVENTOR
Charles R. Underhill
BY
[signature]
ATTORNEY

No. 766,474. Patented August 2, 1904.

UNITED STATES PATENT OFFICE.

CHARLES R. UNDERHILL, OF PROVIDENCE, RHODE ISLAND.

RECEIVING TELEGRAPH INSTRUMENT.

SPECIFICATION forming part of Letters Patent No. 766,474, dated August 2, 1904.

Application filed June 1, 1903. Serial No. 159,409. (No model.)

*To all whom it may concern:*

Be it known that I, CHARLES R. UNDERHILL, a citizen of the United States, and a resident of Providence, in the county of Providence and State of Rhode Island, have invented certain new and useful Improvements in Receiving Telegraph Instruments, of which the following is a specification.

This invention relates to a receiving telegraph instrument; and its main object is to provide an instrument by means of which the code characters of a telegraph-code may be translated into other characters, and especially into ordinary letters, figures, &c., of a language.

A further object of the invention is to record or print the characters into which the code-signals are translated, and hence to provide an instrument capable of receiving telegraphic matter and converting it into messages recorded in the form of words and sentences of any desired language.

The principal feature which distinguishes my improved receiving instrument from all other telegraph instruments, whether of the ordinary type or of that class known as "printing-telegraph" instruments, is a translating-receiver controlled by combinations of signals representing the respective code characters of a telegraphic code and controlling the selection of devices representing the characters of ordinary language, these devices being selected by the instrument when the respective groups of signals corresponding to their code characters are received by the instrument. The devices representing the characters into which the code-signals are to be translated will preferably be types representing the usual letters, figures, &c., and these types constitute character-indicating or character-recording devices, each one of which is represented by a particular combination of telegraphic code-signals and is brought into operation only when its particular combination of code-signals is received.

In most telegraph systems in which Morse or other code characters are converted into language and recorded as letters, words, and sentences the conversion of the message from one system into the other is usually effected by assigning a predetermined value in terms of makes and breaks of the circuit to each letter, figure, &c., and selecting such letters and figures in accordance with the transfer of the proper numbers of makes and breaks of the circuit by a make-and-break wheel. The present invention is distinguished from these in many ways, but chiefly by reason of the fact that translation of the message is accomplished wholly by the receiving instrument and by the further fact that the selection of each letter, figure, or other character of the language into which the telegraphic signals are to be converted is determined by the number of signal components of each code character, by the value of each such component, and by the position of each component with respect to the others of its code character. The operation of the receiving instrument is therefore dependent upon the analysis of the telegraphic code characters and the conversion of the components or signals of these code characters, they being preferably converted into representative movements the sum of which for any code character will represent and will control the selection of a corresponding character of the language into which the telegraphic code characters are to be translated.

As is well known, most of the characters of the Morse and other telegraph codes are composed of combinations of two electric signals separated by breaks in the circuit, these two signals being of different values and constituting what are known as "dot" and "dash" signals, which differ from each other merely with respect to the length of time during which the current flows, the dash being made by keeping the circuit closed a greater length of time than when a dot-signal is to be sent. The time constants of these two signals or signal components of the code characters are therefore different. This difference in the signal values of the dots and dashes of the majority of the characters of a telegraph-code may be utilized to control different operations corresponding, respectively, to said dots and dashes, and those code characters which are represented by or embody a signal or signals differing in value—that is, in which the time constant is different from either the dot or the dash—may also be converted into the proper character or characters of another system by making provision for the control of another operation or operations by such signal or signals of greater length than a dot or a dash. Thus the electrical signals forming components of any code character may be utilized to control, selectively, in accordance with the different values or time constants of such signals, a series of different functions or movements, each of which is the representative of its particular electrical signal. When the functions or operations so controlled have the proper relative values, they may be brought together in such combinations that each combination will have a different characteristic or value from every other and will be representative of a different letter, figure, or other character of the language into which the code characters are to be translated. The capacity of the telegraph instrument constituting the subject-matter of this invention for converting the characters of a telegraph-code into the symbols of language is dependent upon the application of these two principles. Said instrument therefore constitutes a means for analyzing the telegraphic-code characters and for combining synthetically representatives of the components into which the code characters are resolved in such a manner that each particular combination of these representatives, whether they be movements or other functions, will control the selection of a character in the second system or language corresponding to the particular combination of signals controlling said combination of representative functions or movements.

In the Morse code, for example, the greatest number of electrical signals found in any single code character is six, and each of these signals may be either a dot or a dash. It is essential, therefore, that the dot and dash for any one of these six positions control representative functions or movements, and it is also desirable that the sum of the values of the functions or movements representing a dot and a dash of any one of these six positions be different from the sum of such functions or movements for each of the other five positions. The values assigned to these dot and dash signals may be varied within wide limits, but they are preferably as follows: for the first period, one for the dot and sixteen for the dash; for the second period, two for the dot and twelve for the dash; for the third period, one for the dot and seventeen for the dash; for the fourth period, three for the dot and seventeen for the dash; for the fifth period, four for the dot and eight for the dash, and for the sixth period, one for the dot. As in the Morse code, there is no dash in the sixth period, no value is assigned to the dash for such period. The value of any code character in the Morse code may therefore be determined by merely adding the values of the signal components in the different positions for each code character, and it will be found that the sums of the values of these signal components are all different and that they run substantially in a consecutive series. The dot and dash in each period or position of the code character I term a "group" of signals or signal components, and means are provided for selecting a corresponding group of representative functions or elements and also for selecting the particular representative component of each representative group according as the signal sent is a dot or a dash. The selection of the representative group is preferably determined by a group-selector having a traveling or step-by-step movement, the subdivisions or steps of which movement correspond to the periods or positions of the signals of the code character, and this group-selector will be returned to its normal or zero position after the reception of all the signals of a code character in order that it may be in position to operate properly when the signals of the next code character are received. This group-selector should of course be returned to such normal or zero position after the reception of each code character regardless of the number of signals constituting such code character, and hence regardless of the number of steps such selector has advanced. Hence the traveling movement of this group-selector from its zero position may be a variable one, consisting of any number of steps from one to the maximum, which is in this case six, at the end of which step or steps representing the number of signal components of the code character the group-selector will always be returned to such normal position.

In connection with the group-selector just described it is necessary to provide component-selecting means for choosing that one of the two representative components of a group of representative components or elements which corresponds to the signal received—that is to say, the representative component selected in any group should correspond to the dot or dash signal located in the period or position corresponding to that group of representative components or elements. As each representative component so selected has a different numerical value, it will be evident that the selection of any letter, figure, or other language character may be readily controlled by any numerical value or by the combination or addition of any series of numerical values representing the signal component or components of a code character.

For such language character or characters as may be represented in a telegraphic code by a signal of different value or values from the dot and dash signals special selecting means controlled by such different value or values of the electrical signal may be employed. In my instrument the selection of the representative components corresponding to the dot and dash signals is controlled by the time constants of these electrical signals, and in an analgous manner the selection of the miscellaneous character or characters embodying signal components having a time constant of different value from that of the dot or the dash may be controlled by such other time constant. In the Morse code there are four different electrical signals having different time constants, the signal for the letter "L" being a longer make of the circuit than that representing the dash, while the signal representing the cipher ("0") has a longer time constant than that for the letter "L." Hence in my instrument in order to control the selection of all language characters I provide selecting means having at least four functions or movements corresponding, respectively, to and controlled, respectively, by the four different time constants of the four electrical signal components into which all Morse characters may be resolved.

The analysis of the code characters of a telegraphic code into their electrical signal components and the mode of selecting and combining representative components or elements synthetically for the purpose of selecting the language character corresponding to each code character received have now been described. In order that a telegraphic message may be properly translated into corresponding language characters, words, and sentences, it is important also to consider the non-electrical components of the code characters—that is, the breaks in the circuit between the dots, dashes, &c.—and to consider the relative values of these breaks between the electrical components of the code characters and of the breaks between successive code characters and longer breaks representing the spaces between words, &c. In order to analyze all of the components of a telegraphic message, I therefore provide controlling or selecting means governed by breaks of different values—that is, by breaks of different lengths—and the lengths or time constants of these breaks are employed to govern the selection of such space or other device as it may be necessary to operate in order properly to separate letters, words, &c. As a break in the circuit necessarily follows every make of the same, the selecting means controlled by said makes and breaks has two opposite or reciprocal functions, or rather two sets of opposite or reciprocal functions, one function being the control or selection of one or more devices governed by the makes of the circuit and by the time constants of such makes, and the other being the control or selection of one or more devices governed by the breaks in the circuit and by the time constants of such breaks, so that every function or operation necessary to the analysis of a telegraphic message and to the conversion of it into terms of language is governed by some one of these reciprocal and differential controlling or selecting functions of a translating-receiver operable by every combination of signals capable of being telegraphically transmitted to represent a message.

Other features of my invention not hereinbefore described, but which will be hereinafter referred to, are illustrated in the accompanying drawings, in which—

Figure 2:
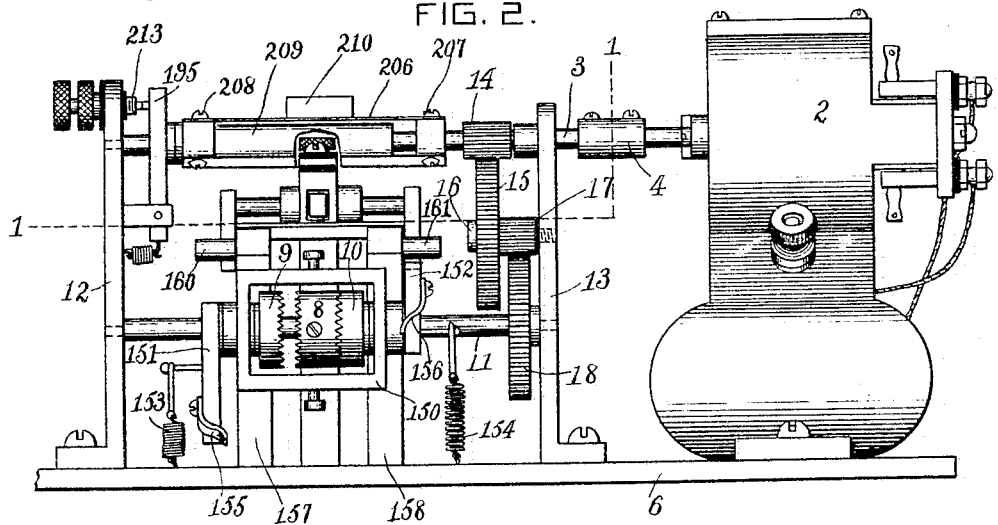
Figure 3:
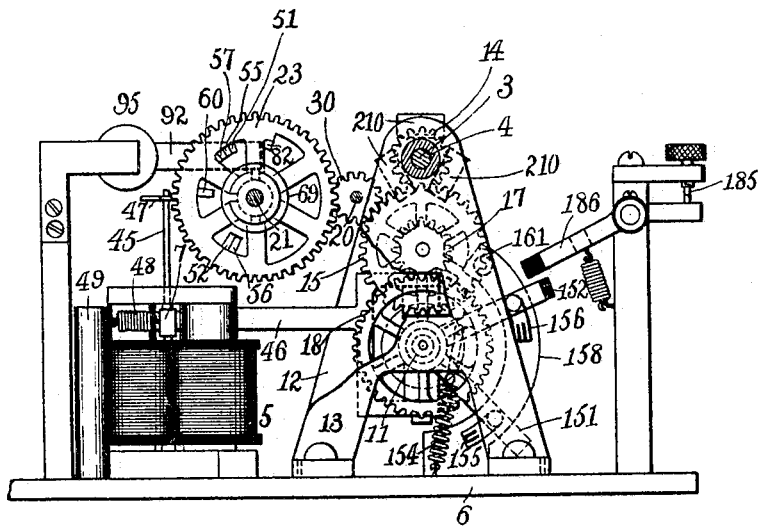
Figure 4:
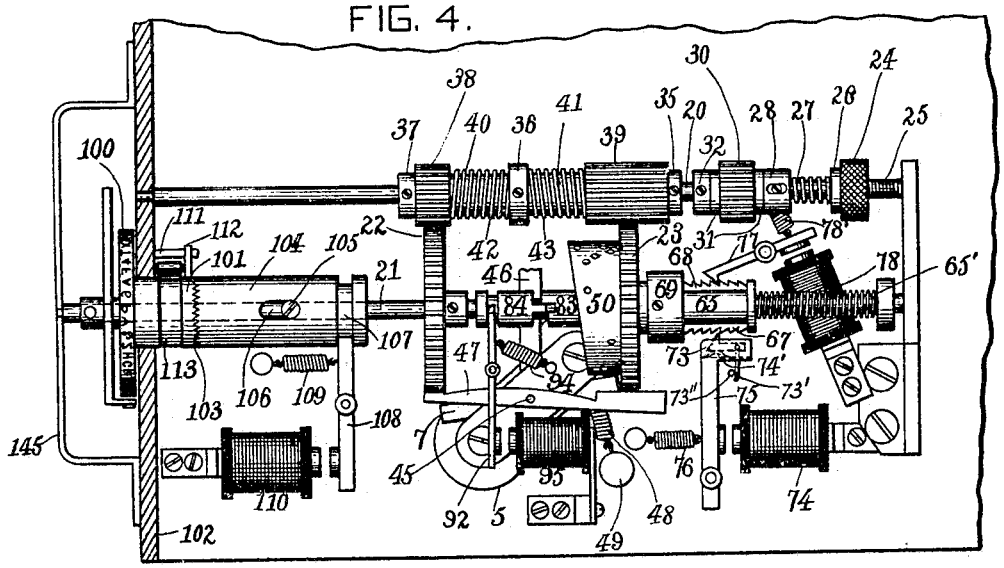
Figure 5:
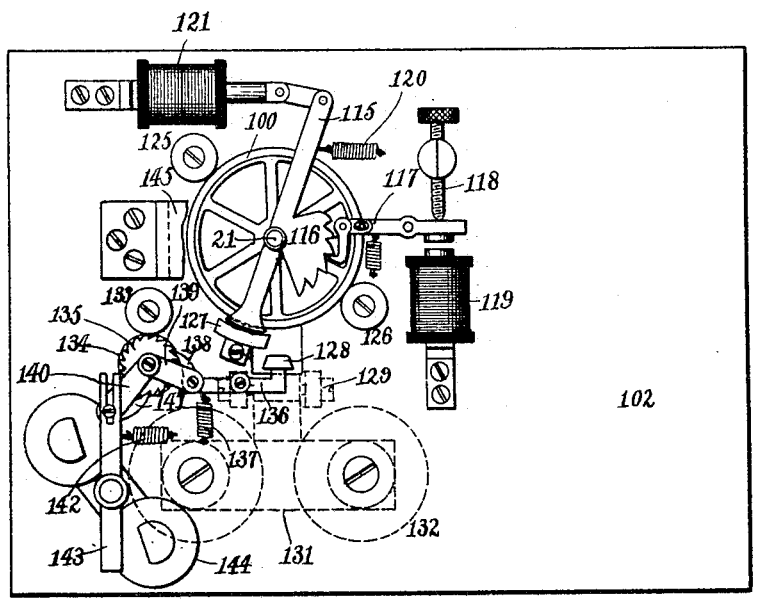
Figure 6:
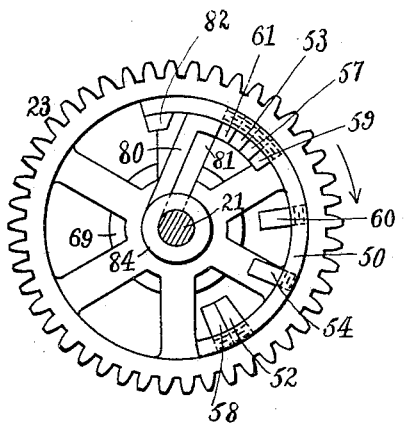
Figure 7:
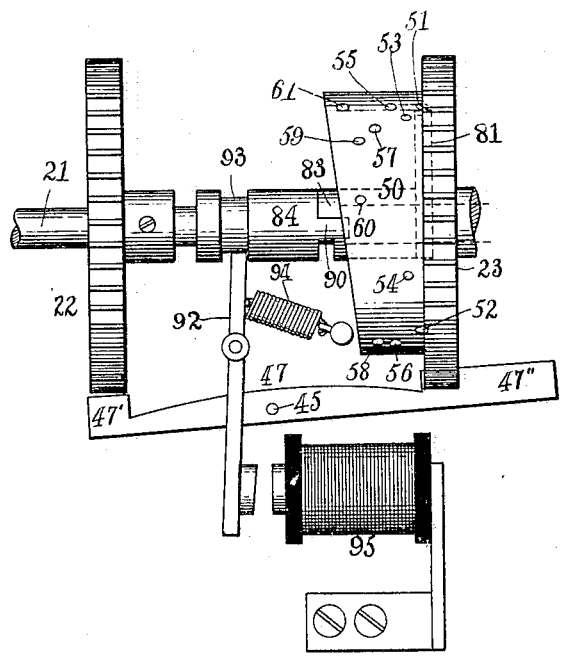
Figure 8:
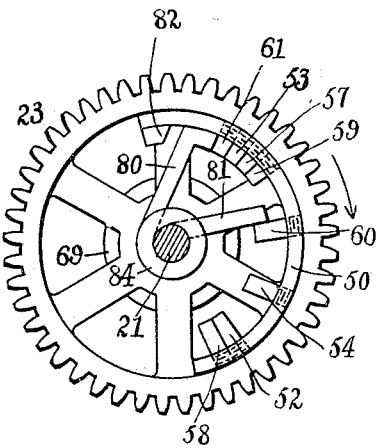
Figure 9:
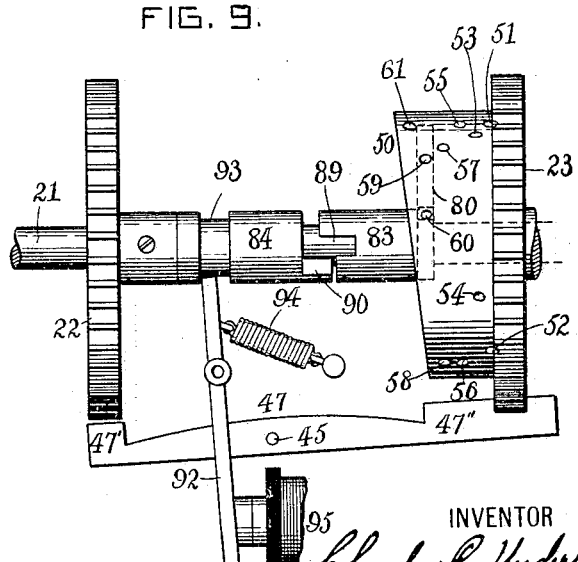
Figure 17:
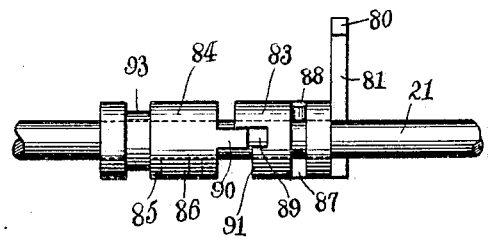
Figure 18:
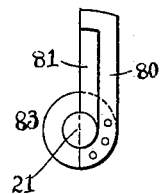
Figure 19:
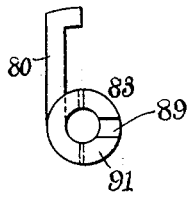
Figure 20:
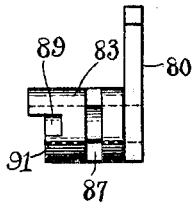
Figure 21:
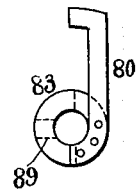
Figure 22:
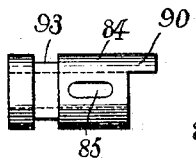
Figure 23:
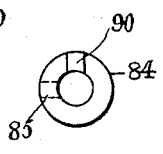
Figures 24, 25:
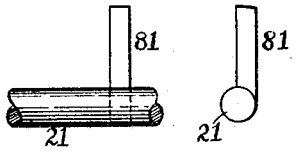
Figure 26:
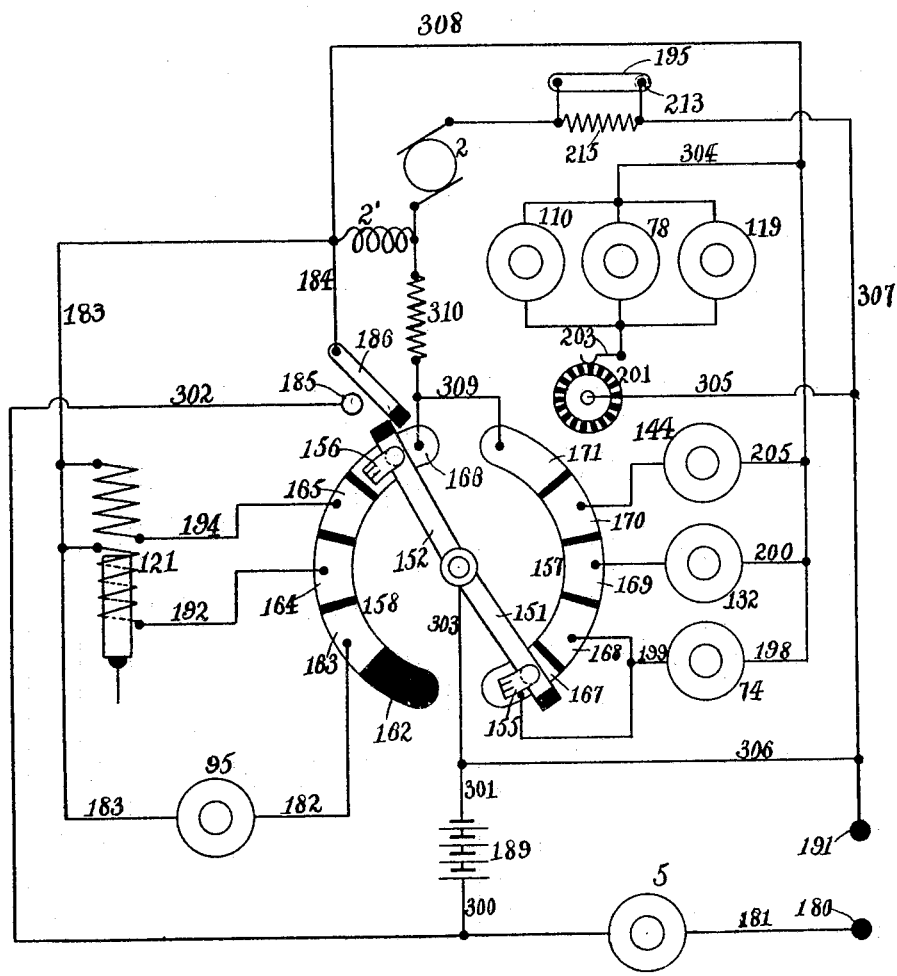

Figure 1 is a sectional plan of an analyzing mechanism of a receiving telegraph instrument embodying my invention, the section being taken in line 1 1, Fig. 2. Fig. 2 is a front elevation of said analyzing mechanism with parts broken away. Fig. 3 is an end elevation of said analyzing mechanism and a portion of the combining or adding mechanism as viewed from the motor end of the instrument with the motor and some other parts removed and parts broken away to show the parts clearly. Fig. 4 is a plan of the upper portion of the instrument, showing the group-selector, the combining or adding mechanism, and the type-selecting devices, the lower portion of the analyzing mechanism and certain other parts being removed for the sake of clearness. Fig. 5 is an end elevation viewed from the left in Fig. 4 and slightly enlarged of the recording or printing mechanism and the spacing and other devices coöperative therewith. Fig. 6 is a detail enlarged to twice the natural size, illustrating in end elevation certain elements of the combining or adding mechanism in position for selecting a dot component. Fig. 7 is a detail on the same scale illustrating the same and other parts in plan in positions corresponding to those shown in Fig. 6. Figs. 8 and 9 are details corresponding to Figs. 6 and 7 and illustrate the positions of the parts for selecting a dash component. Figs. 10, 11, and 12 are respectively a left end, a front, and a right end elevation illustrating on the same enlarged scale the group-selector, the groups of character-selecting components, and the carrier for said components. Figs. 13 and 14 are enlarged details of a feed device complementary to that which operates the component-carrier. Figs. 15 and 16 are enlarged details of the group-selector. Figs. 17 and 18 are respectively front and end elevations illustrating on the same enlarged scale the differential component-selectors and coupling means for bringing them selectively into action. Figs. 19, 20, and 21 are enlarged details of the component-selector representing the dot and one element of the coupling means associated therewith. Figs. 22 and 23 are corresponding views of the complementary coupling member to that shown in Figs. 19 to 21, inclusive. Figs. 24 and 25 are similar details of the component-selector representing the dash. Fig. 26 is a diagrammatic view illustrating the various electrical elements of the instrument and the selecting and controlling means therefor.

Similar characters designate like parts in the different figures of the drawings.

The receiving telegraph instrument forming the subject-matter of this invention embodies two main mechanisms, one of which operates as a translating-receiver and is governed by the signals received, while the other consists of a plurality of character indicating or recording devices, usually in the form of a set of types, assembled about the periphery of a type-wheel. The instrument as a whole comprises a number of subordinate mechanisms or devices each having to perform one or more of the analyzing or combining functions of the instrument. Most of the movements of the different operative parts of the instrument are governed by driving means normally continuously operative, the power requisite for operating the parts being preferably obtained from a small-series electric motor, such as 2, having its armature-shaft detachably connected with the main driving-shaft 3 by means of a coupling-box 4. (See Figs. 1 and 2.) The main element of the controlling or selecting means for analyzing the signals received by the instrument is in this case an electromagnet 5, mounted on the base-plate 6. The armature 7 of this electromagnet has the usual to-and-fro movement, and the two oscillatory movements of this armature, one of which is governed, of course, by the energization and the other by the deënergization of the magnet, are utilized to determine the selection of a pair of reciprocally-operative elements governed, respectively, by the makes and breaks in the circuit to said electromagnet and controlling the movements of those parts which have functions representative of such makes and breaks and of the lengths or time constants thereof. In the preferred construction the shaft 3 is a continuously-rotative driver, and its partial rotations are transmitted to the reciprocally-operative elements just mentioned. These elements may be any suitable for the purpose; but the elements governed directly by the armature 7 preferably constitute coupling means having the usual alternating or reciprocal coupling functions, a pair of coupling members 9 and 10 being shiftable into and out of engagement with a central coupling member 8, secured to the shaft 11. All of these coupling elements may be mounted on a continuously-rotative shaft 11, journaled at its ends, as is the shaft 3, in a pair of uprights 12 and 13, fastened to the base-plate 6. The intermediate clutch member 8 is fastened directly to this shaft, while the other two members 9 and 10 are loosely mounted thereon and are driven alternately by the member 8.

The driving connections between the main driver 3 and the shaft 11, carrying these reciprocally-operative coupling elements, are clearly shown in Figs. 1 to 4, inclusive. As illustrated, they comprise a gear-train connecting the shafts 3 and 11 for rotating the latter continuously and two other gear-trains for alternately operating a pair of elements which determine the extent of feed of a pair of feed devices which determine the feed movements of the component-selectors, these selectors governing in turn the combination or addition of the components representative of the dots and dashes of the code characters, and hence representative of the language characters to be indicated and printed. The first gear-train embodies a pinion 14, secured to the shaft 3 and meshing with a spur-gear 15, mounted on a stud 16 and driving another pinion 17, in mesh with the spur-gear 18, secured to the shaft 11. The other two gear-trains connect an intermediate shaft 20 with another shaft 21, carrying the feed devices just mentioned, these feed devices being also preferably rotary. In order to operate the feed devices at a uniform rate of speed and prevent breaking of any of these parts, a frictional driving connection is preferably maintained between the shaft 20 and the feed devices or gears 22 and 23. The shaft 20 has at one end thereof (see Fig. 4) a resistance member, such as a nut 24, screwed as far onto the threaded portion 25 of the shaft 20 as possible, and this nut has a metallic washer 26 fixedly secured thereto and connected to one end of a rather strong helical spring 27, encircling the shaft 20, and connected at its other end to another metallic washer 28, rotatable with the shaft 20, but having a slight movement longitudinally thereof. The spring 27 presses this washer into engagement with one of a pair of leather washers for frictionally coupling a spur-pinion 30 to the shaft 20 by means of a pair of leather or similar washers 31 coöperating with another metallic washer 32, fast to said shaft. This spur-pinion 30 is continuously driven by the spur-gear 15, and hence tends to rotate continuously the shaft 20. The shaft 20 also has thereon three fixed collars 35, 36, and 37, separated by different intervals, and between each pair of washers is located another driving-pinion having a relatively long hub portion extending therefrom. These gear-pinions are designated, respectively, by 38 and 39 and their hub portions by 40 and 41. Between each of the gears 38 and 39 and the washer 36 is a helical spring, these springs being designated, respectively, by 42 and 43 and surrounding the hub portions 40 and 41 of said gears. The gear-wheels 22 and 23 mesh, respectively, directly with the pinions 38 and 39 and obviously are adapted to be driven thereby. These feed devices are intended to operate reciprocally—that is to say, when one of them is rotating the other is held fast—and the reciprocal movements of these feed devices are also preferably controlled by the same electromagnet 5 that brings the coupling elements 9 and 10 reciprocally into action. This will be clear by referring to Figs. 1, 3, and 4, from which it will be seen that the armature 7 of the electromagnet 5 is secured to a vertical spindle 45, journaled in suitable bearings and also having in fixed relation therewith a duplex shifting-lever 46 for shifting the coupling members 9 and 10 simultaneously, so as to bring them alternately into engagement with the central coupling member 8. Near its upper end the spindle 45 has secured thereto an escapement 47 for permitting the feed-wheels 22 and 23 to turn alternately, the wheel 23 being held fast by the escapement and the wheel 22 being permitted to rotate when the electromagnet 5 is energized and the coupling member 10 clutches to the central member 8. The return movements of the coupling-lever 46 and the escapement 47 are of course controlled by a suitable retracting-spring 48, secured to the post 49. In this construction the gear-wheel 23 forms part of a carrier supporting a plurality of components or groups of components selectible in accordance with the electrical signal components of the code characters received by the instrument. It also constitutes one element of the group-selecting means hereinbefore mentioned.

Referring particularly to Figs. 6 to 9, inclusive, it will be seen that the gear-wheel 23 has secured thereto a segment 50, supporting all of the character-selecting components before referred to, and that these components are divided into six groups, each group with the exception of one containing two components and the components of each group being mounted in different angular positions about the shaft 21. These components are preferably long and short stops or pins representative of the desired feed-values—such, for example, as those which I have hereinbefore stated may be assigned to them—the stops of the first group being designated, respectively, by 51 and 52, those of the second group by 53 and 54, those of the third group by 55 and 56, those of the fourth group by 57 and 58, those of the fifth group by 59 and 60, and that of the sixth group by 61. The component-carrier and all of the parts associated directly therewith are normally mounted to have intermittent rotary movements about the shaft 21 and axially-reciprocatory movements lengthwise of the shaft. These reciprocatory and rotary movements of the carrier 50 determine the selection of the groups according as the carrier is advanced step by step from one position to another along said shaft and also represent the movement of the selected component in each group mounted on the carrier. In order that the pinion 39 and the carrier 23 may remain rotatively connected regardless of the group selected, one of these elements, preferably the pinion, has a tooth-face long enough to control the six stages of the controlling movement of the means for selecting the groups and the components thereof. One of the dogs 47' and 47'' of the escapement 47 also has a face long enough to coöperate with the spur-gear 23 in all of its group-selecting positions. The subdivisions or steps and the traveling movements of the group-selector are determined in this case by a selector proper. (Clearly illustrated in detail in Figs. 11, 15, and 16.) In the form shown this selector is a sleeve 65, mounted to reciprocate along the shaft 21 and held against rotation by the walls of the guide-slot 66, coöperative with a suitable guide. At diametrically opposite points in the periphery of the sleeve toothed racks, preferably two in number and designated by 67 and 68, are shown, each of these racks containing seven rack-teeth or one more than the groups of components to be selected. At one end thereof the sleeve 65 has the socket 69 of a coupling-box and four coupling-pins 70 projecting in this construction inwardly into a groove 71 in the complementary member 72 of the coupling-box. This connection therefore compels the component-carrier and its components to travel lengthwise of the shaft 21, while at the same time permitting said carrier and components to have intermittent feed or rotary movements relative to the sleeve 65. The step-by-step movement of the sleeve 65 may be effected by means of an electromagnetically-operated pawl 73, which in this case is operated by an electromagnet 74 and is preferably controlled by a local circuit, which is made when the main circuit to the telegraph instrument is broken. The pawl 73 is of the by-pass or safety type and is normally pressed toward the teeth of the rack 67 by a light spring 74' on a pivoted armature 75. This pawl has a tail-piece 73', which coacts with a stop, such as the stop-pin 73'', to shift the pawl out of engagement with the teeth of the rack after each step movement of the rack. When the electromagnet 74 is energized, the spring 74' instantly presses the pawl into engagement with the adjacent tooth of the rack and the continued movement of the armature 75 causes the pawl to move the rack one step in opposition to the force of the spring 65'. The breaking of the local circuit through the electromagnet 74 results in the return of the pivoted armature 75 by the spring 76. A releasing-pawl is shown at 77 for the purpose of permitting the sleeve 65 to return to its normal or zero position after the reception of a group of electrical signals representing a code character. This pawl is pivoted in a suitable manner and is operated by an electromagnet 78, which is controlled by the time constant of a break in the circuit to the receiving instrument longer than the breaks between the signal components of the respective code characters. The spring 78' normally holds the pawl 77 in engagement with the teeth of the rack 68 to prevent return movement of the sleeve.

After a group-selector has been shifted axially of the shaft 21 to the desired group-selecting position, component-selecting means, preferably a pair of component-selectors, such as the stop-arms 80 and 81, may be operated selectively to determine which one of the components of any given group shall be permitted to operate to produce a selecting movement representative of the particular electrical signal corresponding to such character-selecting component.

In Figs. 17 to 25, inclusive, I have illustrated in detail the construction of the principal devices for determining the selection of the components 51 to 61, inclusive, and in Figs. 6 to 9, inclusive, the operation of these parts is clearly shown. One of these arms, in this case the arm 81, representing the selection of a component corresponding to the dash, is secured directly to the shaft 21 and is somewhat shorter than the arm 80 in order that it may not come into engagement with the shorter of the two components or stops in any group. The arm 80 is preferably in the plane of rotation of the arm 81 and is representative of the dot in each period of a code character and coacts with the longer stops projecting inwardly from the carrier 50. At the initial end of the carrier or segment 50 a stop-face, such as 82, (see Figs. 6 and 8,) determines the initial or zero position of the two stop-arms 80 and 81, the zero-point being in the common plane of the forward faces of these stop-arms. As the shaft 21 is in this case the driven member, which directly controls the selection of the respective characters or types to be recorded, it will be evident that the arm 81 has an invariable movement in unison therewith. The arm 80, however, is so mounted that it is capable of having a relative rotary movement with respect to that of said shaft. In the preferred construction this arm 80 is secured, as by brazing and pinning, (see Figs. 18 and 21, particularly,) to a sleeve mounted on the shaft 21 and adapted to be coupled thereto and uncoupled therefrom, as required. This sleeve preferably constitutes one of a pair of complementary coupling members and may be of the type shown at 83. The complementary clutch member is preferably of the type indicated at 84—that is to say, it is also a sleeve mounted on the shaft 21—but its operation is different from that of the coupling member 83. The member 84, which is the controlling element of the clutch, has a slot 85 therein coöperating with a pin 86 in such a manner that said clutch member always rotates in unison with the shaft 21, but has a reciprocatory movement axially thereof for the purpose of engaging and disengaging the complementary coupling or clutching element 83. The element 83 of the clutch has no movement axially of the shaft 21, (see Fig. 17,) but is so constructed as to have a partial rotation through an arc of about one hundred and eighty degrees when released by the coupling member 84. This rotary movement of the member 83 is determined by a peripheral slot or cut-away portion 87, extending entirely through about one-half of the member 83, and the end walls of this slot constitute stop-walls for limiting the movement of said coupling member, the sleeve being stopped in either one of its two positions by a pin 88, which, it will be evident, also prevents axial movement of the sleeve. At the inner end thereof the sleeve 83 has a coupling recess or groove 89, which coöperates with a coupling-tongue 90, projecting from the adjacent inner end of the complementary coupling-sleeve 84, and when the tongue 90 is in the groove 89 it will be evident that the two component selectors or arms 80 and 81 will move in unison with the shaft 21. The inner end of the sleeve 83 is cut away to form a face 91, parallel with the extreme end of the sleeve, and the movement of the tongue 90 necessary to disengage itself from the coupling recess 89, is but a trifle greater than the distance from the back wall of said recess 89 to the wall 91, as will be evident by referring to Fig. 17. When the sleeve 83 is uncoupled, as shown in this figure, the arm 80 is free and will have moved into contact with the stop-pin 61, (see Fig. 8,) while the shaft 21 turns in the direction indicated in said view and carries the short component-selector 81 into engagement with one of the long stop-pins on the carrier, and as this movement of the short stop-arm 81 and its shaft may continue through an arc of one hundred and eighty degrees or more before the pin 88 strikes the lower stop-wall of the groove 87 (seen in Fig. 17) it will be clear that the arm 80 cannot interfere with the proper operation of the stop-arm 81 and that said arm will at the proper moment come into engagement with and be stopped by the particular long stop-pin in that group of selecting components or pins opposite which the component-selectors 80 and 81 are at the time. On the stopping of the feed of the wheel 22, and hence of the shaft 21, by either of the arms 80 or 81 coming in contact with a stop-pin on the carrier the escapement operates to engage and lock said wheel 22 and release the other wheel, 23, whereupon said wheel 23 and its carrier will follow up the movement of the wheel 22, travel through an arc equal to that traversed by the preceding movement of the wheel 22, and will be stopped by the engagement of the long stop-arm 80 with the short stop-arm 81, which is held at such time in a fixed position by the shaft 21, this partial rotation of the wheel 23 serving to return the coupling member 83 to a position corresponding to that shown in Fig. 17, when the tongue 90 will slip back into the recess 89, and thus lock the long arm 80 to the shaft 21 again, the actual movement of the arm 80 being effected by the stop 82, which moving into engagement with the back of the stop-arm 80 always carries said stop-arm with it when the gear-wheel 23 is released to follow up a movement of the wheel 22.

The shifting of the coupling member 84 away from its normal position, in which it is coupled to the complementary member 83, may be effected in any desired manner, but preferably by a shifting-lever, such as 92, one end of which works in the slot 93 and which is preferably held in its coupled position by means of a spring, such as 94, and is operated in the other direction to release the coupling member 83 by means of an electromagnet 95, controlled by the dash-signals of the code characters received by the instrument. When the dot-signal is received, however, this magnet is not operated. As the different dot and dash signals of the respective periods from the first to the sixth are received the wheel 22 will first be turned a distance representative of the particular character-selecting component represented by the electrical signal received, and said wheel will then be stopped and the wheel 23 will have an equal movement following up that of the wheel 22 in order to permit the wheel 22 to be free to turn again when another character-selecting component is brought into action. Thus the wheel 22 advances by successive partial rotations representative of the electrical signal components of the code characters received until the last partial movement representing the last signal component is printed, when the wheel will have added a series of values the total of which will represent and determine the location at the printing-point of the language character corresponding to the code character received. Provision must of course be made for returning each language character after its selection and after printing to its original position.

While the character-selecting means just described may be caused to select indicating or recording devices illustrating language characters organized in any well-known manner, I have shown herein a plurality of these characters or types disposed about the periphery of a type-wheel 100, which is normally coupled to the shaft 21, but is released after printing in order that it may return to a zero position and coöperate properly with the selecting mechanism when the next series of electrical signals is received. In this case said type-wheel has a hub 101 journaled in the end plate 102 of the instrument and formed at its inner end with coupling-teeth 103, which coöperate with a complementary coupling member 104, mounted on the shaft 21 and held against rotation by a stop pin or screw 105, but free to move axially on said shaft a distance represented by the slot 106. This coupling member 104 is peripherally grooved, as at 107, and is operated by means of a shifting-lever 108, controlled by a spring 109 and an electromagnet 110. When said electromagnet is energized, the type-wheel is released by the withdrawal of the coupling member 104 therefrom and is free to return to its zero position. This position in the present case is determined by a stop 111 on the end plate 102, against which stop a stop-arm 112 on the type-wheel strikes, when a return movement is imparted to said wheel. This return movement may be effected advantageously by a coiled spring 113, one end of which is fastened to the plate 102 and the other end of which is secured to the back wall of a groove in the hub in which the spring is coiled, as shown in Fig. 4.

The devices hereinbefore described are controlled solely by the ordinary dot and dash components of a telegraphic code—that is, by signal components of two values. Certain characters, however, are governed by an electrical signal or signals of greater length than the dot or the dash, and these miscellaneous electrical signals having values or time constants greater than the dot or the dash will preferably control the language characters represented thereby through separate means from that previously described. The selection of these few characters may be accomplished in many ways, but the means shown herein will suffice for the purpose. The letter "L" and the cipher "0" are the only characters in common use in the Morse code that are represented by electrical signals of greater length than a dot or a dash, and the "L" and "0" types are mounted herein on a lever pivoted on the extended end of the shaft 21, so that the types will move in the same plane as those of the type-wheel 100. This lever is designated 115 and has in connection therewith a ratchet-segment 116, which coöperates with a stop-pawl 117, spring-pressed, adjustable in position by an adjusting-screw 118, and releasable from the ratchet-wheel by an electromagnet 119. In this construction a spring 120 normally holds the lever 115 and its types "L" and "0" away from the printing-point, and the lever has two different movements, controlled, respectively, by the differential action of a compound solenoid 121, mounted on the end plate 102 and having its coils so connected as to shift the first character on the lever 115 to the printing position when the electrical signal having a value or time constant next in order above that of the dash is received, while the second character on the lever 115 is brought to the printing-point when the signal component having the highest value in the Morse code is received. Half of the coils of the solenoid are energized, preferably, for the selection of the first of these two characters, and all of the coils when the second character is to be recorded.

The type-wheel 100 and the types on the lever 115 may be inked in any suitable manner, ink-rolls 125 and 126 being shown for the former and an inking-pad 127 for the latter. Impression may be effected by bringing a swinging platen, such as 128, into engagement with the type, which is located at the printing-point when said platen is operated. This platen is pivoted at 129 at a suitable point on the frame, and at its upper end passes through and works in an opening in the end plate 102. (See Fig. 5.) At its lower end it is connected to the armature 131 of the electromagnet 132, by which its working movement is effected. The advance of this platen 128 toward the printing-point and into engagement with the selected type also serves to indicate the letter-space feed of a paper-feeding device, which may be of any suitable type. The paper on which the characters are to be printed is not illustrated herein, but will pass from a suitable reel to the space between the type-wheel and the platen and through a pair of feed-rolls 133 and 134, by which it will be advanced. A ratchet-wheel 135 at one end of the feed-roll 134 controls the feed movements of this paper, and its operation is preferably controlled by a differential feed mechanism which operates to turn the feed-roll 134 one step after each letter and two or more steps after each word in order to effect the proper letter-spacing and word-spacing movements. The letter-spacing is here accomplished by the platen, a pivoted lever being shown at 136, which is so operated by a spring 137 as to follow the platen toward the printing-point and draw back a feed-pawl 138 to indicate the feed on the working stroke of the platen, while the actual feed movement is accomplished by the platen on its return movement. The pawl 138 is mounted on a rock-arm 139, pivotally connected to said lever 136, and another similar rock-arm, pawl and lever, and spring (designated by 140, 141, 142, and 143) determine the word-space movement of the feed-rolls, the indication of the feed for word-spacing being determined by an electromagnet 144. Both of these spacing movements are controlled by the time constants of breaks in the circuit to the instrument, it being understood that in telegraphic messages a longer space is left between code characters than between electrical signal components of such characters and that still greater space is left to indicate the space between words. The extreme left-hand end of the shaft 21, adjacent to the various parts just described, is supported by and has a bearing in a yoke 145, fastened to the end plate 102.

It has been hereinbefore stated that the coupling members 9 and 10 are alternately engaged with and disengaged from the continuously-rotative central coupling element 8, and these two members 9 and 10 constitute the principal means for analyzing the code characters received by the instrument and for selecting for operation various devices representing the different values or time constants of the different makes and breaks of the circuit to said instrument. These coupling members 9 and 10 are preferably provided with long hubs, which are journaled in and reciprocate in the direction of their axes with a rectangular frame 150, the shifting of which is governed by the shifting-lever 46, before described. Mounted on these hubs and preferably frictionally connected therewith so as to turn normally with their respective coupling elements are complementary reciprocally-operative selectors, preferably in the form of automatic electrical controlling-switches 151 and 152, these switches, however, being preferably so connected with the elements 9 and 10 as to yield when an abnormal movement of the corresponding coupling element occurs. These selectors or controlling-switches are normally held in the position shown at the left in Fig. 2 when messages are not being sent, each switch being normally drawn down by a spring, such as 153 or 154, having a suitable connection with the switch, in this case a sliding connection to compensate for the axial reciprocating movements of the switches. Near their ends the arms 151 and 152 carry brushes 155 and 156, which coöperate alternately with two series of electrical contacts, one series of which is carried by a segment 157 and the other by a segment 158, (see Figs. 1 and 2,) the manner in which the respective contacts are arranged in each segment being illustrated diagrammatically in Fig. 26. The limit of the upward movements of the switches 151 and 152 is determined in this case by a pair of long stops 160 and 161 in fixed relation with the segments at the upper ends thereof.

Whether the device to be selectively operated by the make and break components of the message received is governed by a make or a break in the circuit is determined by the electromagnet 5, which shifts one or the other of the clutch elements 9 and 10 into engagement with the central member 8 and at the same time carries the corresponding contact-brush into engagement with the face of the segment, at the same time carrying the other brush away from its segment. Which one of the devices controlled by a make or a break is to be operated is determined by the length of the make or break of the circuit. The switch-arm 152 and the contacts on the segment 158 are controlled by makes in the circuit, while the arm 151 and the contacts on the segment 157 are governed by the breaks.

Referring now to Fig. 26, it will be seen that the main electromagnet 5 is operated from a source of energy or battery 189, the circuit being made or broken across the terminals 180 and 191 by means of a main-line relay or by the sending-key or other device for making and breaking the circuit. The source of energy or battery for controlling and operating the main electromagnet 5 may be in the main-line circuit, but is preferably located as just described. It will also be seen that each segment is divided into five main parts, the first section of the segment 158 being blank or covered with insulation, as indicated at 162, while the remainder of the segment traversed by the arm 152 is divided into four contacts or contact-sections 163, 164, 165, and 166, insulated from one another. The segment 157 is divided into five sections or contacts insulated from one another and designated, respectively, by 167, 168, 169, 170, and 171. According as the make or break of the circuit is shorter or longer the switch-arm controlled thereby will travel through a shorter or longer arc corresponding substantially to the time constant of the make or break in the circuit. The section 162 is blank, because the shortest make of the circuit may operate directly upon the device controlled thereby without regard to selecting devices; but all other signals differing therefrom must be controlled by different contacts on the segments. If the signal is a make representing a dash, the switch 152 moves through an arc approximately twice as great as when a dot is received, and hence reaches the contact 163 and closes a circuit through switch 152, contact-brush 156, contact 163, conductor 182, electromagnet 95, (which operates to release the sleeve 83 and permit the component-selector 81, representing the dash, to move away from the selector 80, which represents the dot,) the circuit from this point being through the conductor 183 and conductor 184 to the lever of an automatic switch 186 (which switch will be hereinafter described) for breaking all local circuits (except that of the main electromagnet 5) from a source of energy or battery 189, the circuit from this point being by way of switch-point 185, conductors 302 and 300 to the source of energy 189, and conductors 301 and 303 to switch 152.

When the letter "L" is to be selected, the switch 152 moves a greater distance and the brush 156 engages the contact 164, from which point the circuit is through conductor 192 to solenoid 121, one-half of the coils of which are energized, the return-circuit being by way of conductors 183 and 184 and the other devices just described. When the cipher "0" is selected, the movement of the switch-arm 152 is still longer, owing to the increased value of the time constant of the electrical signal received, and the brush reaches the contact 165 and closes a circuit through the conductor 194, which energizes the other half of the coils of the solenoid 121, the return-circuit being through conductors 183 184, &c., as before.

Should the arm 152 travel through a longer arc than any of those just described and the contact-brush 156 pass beyond the contact 165, the contact-brush coming into contact with segment 166 practically short-circuits the armature 2 of the motor while the current from the source of energy is flowing through the field-coil 2'. This destroys the function of the motor to convert electrical energy into work, but causes the kinetic energy stored in the armature to generate an electric current which, flowing from the armature 2 through resistance-coil 215, (or switch 195 and point 213,) conductors 307, 306, and 303, switch 152, brush 156, contact 166, conductor 309, and resistance 310, tends to react on the armature, thus acting as a brake and suddenly stopping the armature, the suddenness of stopping depending upon the resistance in the coil 310. In this case the resistance is so adjusted that kinetic energy in the armature is not entirely counteracted by the current generated by it, thus leaving enough energy to operate the automatic switch 186, as before described. Any tendency of the motor or other parts to turn backward after stopping may be counteracted by means of a ratchet-wheel placed upon one of the rotary parts and engaged by a pawl. The normal motor-circuit is from the source of energy 189 through conductors 300 and 302, switch-point 185, automatic switch 186, conductor 184, field-coils 2', armature 2, regulating-switch 195, (which will be hereinafter described,) conductors 307, 306, and 301 to the source of energy 189.

After each make of the circuit there is a break the length of which varies according as it is desired to indicate the ordinary interruption of the circuit after transmission of an electrical signal component of a code character or an extra space in a code character, a space between code characters or a word-space coming at the end of a series of code characters. The ordinary interruption after each electrical signal component is received is the shortest and in this case is determined by contact 167 of the segment 157, it being clear from the previous description of the construction and operation of the clutch mechanism controlled by the electromagnet 5 that the switch-arm 151 is caused to move each time that the circuit is broken. The various contacts 167, 168, 169, 170, and 171 correspond to different spaces, and all of these contacts govern branches of a local circuit preferably controlled directly by the source of energy or battery 189 and are not governed by current in the circuit to the receiving instrument. In fact, all of the electrically-operated elements governed by breaks in the circuit to said instrument are dependent upon the mechanical operation of the switch 151 resulting from the coupling of such switch to the shaft 11 when the armature of the electromagnet 5 is retracted by its spring 48. If the break is the ordinary one, the brush 155 closes a circuit through the arm 151 and the conductors 303 and 301 to the battery 189, from which the circuit is by way of conductors 300 and 302 to the switch-point 185, automatic switch 186, (this switch being operated by both switch-arms 151 and 152, as before described and as shown clearly in Figs. 1 and 3,) conductors 184, 308, and 198 to the electromagnet 74 and conductor 199 back to contact 167. This electromagnet 74, as before stated, controls the group-selecting operation and when thus energized shifts the group-selector to a new group position. When an extra space occurs in a code character, as is frequently the case, an extra feed movement may be imparted to the group-selector by energizing the electromagnet 74 a second time, this being done in the present case by providing a second contact 168, insulated from the contact 167, so that the brush 155 makes the circuit to said electromagnet twice when it is influenced by a longer break than the ordinary one between dots and dashes. After each code character has been received and the corresponding language character printed a longer space is required, and it is made use of to control the letter-spacing and printing functions of the apparatus. As the letter-spacing should take place after printing, the contact 169 preferably controls the printing-magnet 132, and the letter-spacing is controlled indirectly, it being effected, as before described, by the platen, which on the energization of the printing-magnet 132 has its working stroke and simultaneously indicates the letter-space feed, but does not actually operate the feed-rolls until its return stroke. The circuit from the contact-brush 155 for controlling the printing operation is substantially the same as that just described, except that from the return-conductor 308 the current passes by way of conductor 200 through the printing-electromagnet 132 and the contact 169.

Several other operations which it is desirable to effect at substantially the same time as the letter-space function may be governed by a make-and-break wheel 201, moving in unison with and preferably secured to the shaft of the feed-roll 134. This make-and-break wheel has the same number of contacts and gaps or insulating-points as there are teeth in the ratchet-wheel 135, mounted on said feed-roll, in order that the circuit controlled by said make-and-break wheel may be first made and then broken every time the feed-roll is turned one step to feed the paper a distance representing the space between letters. The devices which are controlled by this make-and-break wheel are the electromagnet 110, governing the return of the type-wheel to its zero position after the type has been located and printed, the electromagnet 78, which releases the group-selector and permits it to return to its initial position after each code character has been received, and the electromagnet 119, which releases the holding-pawl 117 and permits the lever 115 to return to its normal position after each operation thereof to bring one of the miscellaneous characters represented by the longest two electrical signals to the printing position. All three of these electromagnets are preferably connected in parallel in a circuit which is normally open and which passes from the battery 189 through conductors 300 and 302, switch-point 185, automatic switch 186, conductors 184, 308, and 304 to said three electromagnets 110, 78, and 119, connected in parallel, the opposite sides of these electromagnets being connected to the contact-arm 203 of the make-and-break device, which is normally opposite a gap or insulating-point of the wheel 201. The hub of this wheel is connected by a conductor 305 to conductors 307, 306, and 301, through which the circuit is completed. It will be evident that all of the three electromagnets just described will be operated simultaneously at each turning of the make-and-break wheel 201.

A longer space than any of those before described is necessary for the space between words, and this word-space is represented by the contact 170. When a space of this length occurs in a telegraphic message, the brush 155 reaches the contact 170 and closes a circuit which is substantially the same as those before described with respect to the electromagnets 74 and 132, except that from the return-conductor 308 the current passes through a conductor 205 and the electromagnet 144, before described, to said contact 170. This electromagnet 144 indicates a greater feed than that indicated by the magnet 132, (preferably a feed twice as great,) and the actual movement of the feed-roll 134 is accomplished by the spring 142. At the same time the make-and-break wheel 201 is turned and causes the energization of electromagnets 110, 78, and 119 and the operation of the parts controlled thereby; but these are merely additional operations assuring the return of the type-wheel, the group-selector, and the lever 115 to their normal positions and do not interfere with the movements of any of the other parts. Should the switch 151 travel onto the contact 171, it will break the motor-circuit in the manner before described by short-circuiting the armature and raising the arm of the automatic switch 186.

In addition to the devices hereinbefore described I prefer to employ suitable means for governing the operation of the motor, so as to maintain a uniform speed of rotation of its armature. This I accomplish in the present case by providing a regulator which operates substantially on the principle of a mechanical governor and also by employing in connection therewith a regulating-switch governed by the operation of said mechanical regulator. The governor or mechanical regulator may be of any suitable construction, but consists in this case of a plurality of resilient strips 206, secured at their ends to a pair of end pieces 207 and 208, the former of which is fixed to the shaft 3 and the latter of which is fastened to a sleeve 209, mounted to slide on said shaft. Weights 210 are attached to the strips 206, preferably at their centers. As the shaft 3 rotates these weights tend to fly out from the shaft, and the higher the speed the greater will be the movement of said weights, and hence the greater the resistance to such rapid rotation, this regulator thus operating in all respects substantially as a mechanical governor for maintaining a uniform rotation of the armature-shaft. As these weights fly outward of course the hub 208 and the sleeve 209 move inward toward the motor, and this movement is made use of to control a regulating-switch 195, pivoted on the upright 12. This switch normally rests on a contact 213, and hence normally closes the motor-circuit through the path hereinbefore described—that is, through the whole length of the regulating-switch 195. When, however, the hub 208 and the sleeve 209 move inward, the regulating-switch follows them and breaks the circuit at 213 and rests against the end of the sleeve 209, which constitutes a mechanical stop for the regulating-switch. Another path through a resistance 215, as seen in said figure, is presented for the current when contact is broken at 213, and hence this regulator and its switch not only tend to keep the armature-speed constant, but also slow down the same very materially in case of a sudden abnormal acceleration in the speed, this slowing down being due to the passage of the current through said extra resistance 215.

What I claim is—

1. A receiving telegraph instrument comprising a plurality of character-indicating devices, and a translating-receiver common to said devices and controlling them selectively in accordance with the combinations of receiver-influencing signals representing their respective code characters and having means for selectively converting each signal of a code having signals of different lengths for various positions of a code character into two movements one of which is characteristic of the length and the other of which is characteristic of the position of such signal.

2. A receiving telegraph instrument comprising a plurality of character-recording devices, and a translating-receiver common to said devices and controlling them selectively in accordance with the combinations of receiver-influencing signals representing their respective code characters and having means for selectively converting each signal of a code having signals of different lengths for various positions of a code character into two movements one of which is characteristic of the length and the other of which is characteristic of the position of such signal.

3. A printing-telegraph instrument, comprising a set of types, and a translating-receiver common to said types and controlling them selectively in accordance with the combinations of receiver-influencing signals representing their respective code characters and having means for selectively converting each signal of a code having signals of different lengths for various positions of a code character into two movements one of which is characteristic of the length and the other of which is characteristic of the position of such signal.

4. A receiving telegraph instrument comprising a plurality of character-indicating devices, and a translating-receiver constructed and operative to transform the combinations of receiver-influencing signals representing the respective code characters of said devices into a plurality of different movements representing said devices and controlling them selectively said receiver having means for selectively converting each signal of a code having signals of different lengths for various positions of a code character into two movements one of which is characteristic of the length and the other of which is characteristic of the position of such signal.

5. A receiving telegraph instrument comprising a plurality of character-indicating devices, and a translating-receiver embodying a pair of reciprocally-operative elements the working stroke of one of which is controlled by the makes and the working stroke of the other of which is controlled by the breaks in the circuit to the receiver and controlling said devices selectively in accordance with the combinations of signals representing their respective code characters said receiver having means for selectively converting each signal of a code having signals of different lengths for various positions of a code character into movements characteristic of the length and position of such signal.

6. A receiving telegraph instrument comprising a plurality of character-indicating devices, and a translating-receiver embodying a pair of reciprocally-operative variably-movable elements the working stroke of one of which is controlled by variable makes and the working stroke of the other of which is controlled by variable breaks in the circuit to the receiver and controlling said devices selectively in accordance with the combinations of signals representing their respective code characters and having means for selectively converting each signal of a code having signals of different lengths for various positions of a code character into movements characteristic of the length and position of such signal.

7. A receiving telegraph instrument comprising a plurality of character-indicating devices, and a translating-receiver embodying a pair of reciprocally-operative elements each movable about a center and the working stroke of one of which is controlled by the makes and the working stroke of the other of which is controlled by the breaks in the circuit to the receiver and controlling said devices selectively in accordance with the combinations of signals representing their respective code characters said receiver having means for selectively converting each signal of a code having signals of different lengths for various positions of a code character into movements characteristic of the length and position of such signal.

8. A receiving telegraph instrument comprising a plurality of character-indicating devices, and a translating-receiver embodying a pair of reciprocally-operative elements each oscillatory about a center and the working stroke of one of which is controlled by the makes and the working stroke of the other of which is controlled by the breaks in the circuit to the receiver and controlling said devices selectively in accordance with the combinations of signals representing their respective code characters said receiver embodying means for selectively converting each signal of a code having signals of different lengths for various positions of a code character into movements characteristic of the length and position of such signal.

9. A receiving telegraph instrument comprising a plurality of character-indicating devices, and a translating-receiver embodying a pair of reciprocally-operative elements each movable about a common center and the working stroke of one of which is controlled by the makes and the working stroke of the other of which is controlled by the breaks in the circuit to the receiver and controlling said devices selectively in accordance with the combinations of signals representing their respective code characters said receiver having means for selectively converting each signal of a code having signals of different lengths for various positions of a code character into movements characteristic of the length and position of such signal.

10. A receiving telegraph instrument comprising a plurality of character-recording devices, and character-selecting components corresponding in number to the maximum number of signal components of any of the code characters representing said recording devices and controlled selectively by the signal components in combinations corresponding to those of the code characters each character-selecting component being responsive only to, and characteristic of the position of, the corresponding signal component of a code having signals of different lengths for various positions of a code character.

11. A receiving telegraph instrument comprising a plurality of character-recording devices, and a series of character-selecting components corresponding in number and successive positions to the maximum number of signal components of any of the code characters representing said recording devices and controlled selectively by the signal components in combinations corresponding to those of the code characters each character-selecting component being responsive only to, and characteristic of the position of, the corresponding signal component of a code having signals of different lengths for various positions of a code character.

12. A receiving telegraph instrument comprising a plurality of character-recording devices, groups of differential character-selecting components which groups correspond in number to the maximum number of signal components of any of the code characters representing said recording devices, a group-selector, and a component-selector controlling the character-selecting components of each group and constituting with said group-selector means for selectively converting each signal component of a code having signals of different lengths for various positions of a code character into movements characteristic of the length and position of such signal component.

13. A receiving telegraph instrument comprising in combination with a plurality of character-recording devices; the following complementary elements, viz.—groups of differential character-selecting components corresponding in number to the maximum number of signal components of any of the code characters representing said recording devices, and a group-selector—one of which elements is controlled by the signal components; and a component-selector also governed by said signal components and controlling the character-selecting components of each group and constituting with said group-selector means for selectively converting each signal component of a code having signals of different lengths for various positions of a code character into movements characteristic of the length and position of such signal component.

14. A receiving telegraph instrument comprising in combination with a plurality of character-recording devices; the following complementary elements, viz.—a series of groups of differential character-selecting components which groups correspond in number and successive positions to the maximum number of signal components of any of the code characters representing said recording devices, and a group-selector—one of which elements has a step-by-step movement controlled by the signal components; and a component-selector also governed by said signal components and controlling the character-selecting components of each group and constituting with said group-selector means for selectively converting each signal component of a code having signals of different lengths for various positions of a code character into movements characteristic of the length and position of such signal component.

15. A receiving telegraph instrument comprising in combination with a plurality of character-recording devices; the following complementary elements, viz.—groups of differential character-selecting components which groups correspond in number to the maximum number of signal components of any of the code characters representing said recording devices, and a group-selector—one of which elements is controlled by the signal components; and component-selecting means controlling the character-selecting components of each group and governed by signal components of different values and constituting with said group-selector means for selectively converting each signal component of a code having signals of different lengths for various positions of a code character into movements characteristic of the length and position of such signal component.

16. A receiving telegraph instrument comprising in combination with a plurality of character-recording devices; the following complementary elements; viz.—groups of differential character-selecting components corresponding in number to the maximum number of dot and dash components of any of the code characters representing said recording devices, and a group-selector—one of which elements is controlled by said dot and dash components; and component-selecting means controlling the character-selecting components of each group and governed by said dot and dash components and constituting with said group-selector means for selectively converting each dot or dash of a code having dots and dashes for various positions of a code character into movements characteristic of the length and position of such dot or dash.

17. A receiving telegraph instrument comprising in combination with a plurality of character-recording devices; the following complementary elements, viz.—groups of differential character-selecting components corresponding in number to the maximum number of signal components of any of the code characters representing said recording devices, and a group-selector—one of which elements is controlled by the signal components; and component-selecting means controlling the character-selecting components of each group and embodying an automatic component-controller having differential movements governed respectively by signal components of different values and constituting with said group-selector means for selectively converting each dot or dash of a code having dots and dashes for various positions of a code character into movements characteristic of the length and position of such dot or dash.

18. A receiving telegraph instrument comprising in combination with a plurality of character-recording devices; the following complementary elements, viz.—groups of differential character-selecting components corresponding in number to the maximum number of signal components of any of the code characters representing said recording devices, and a group-selector—one of which elements is controlled by the signal components; and component-selecting means controlling the character-selecting components of each group and embodying an automatic controlling-switch having differential movements governed respectively by signal components of different values and constituting with said group-selector means for selectively converting each dot or dash of a code having dots and dashes for different positions of a code character into movements characteristic of the length and position of such dot or dash.

19. A receiving telegraph instrument comprising in combination with a plurality of character-recording devices; the following complementary elements, viz.—groups of differential character-selecting components corresponding in number to the maximum number of signal components of any of the code characters representing said recording devices, and a group-selector—one of which elements is controlled by the signal components; and component-selecting means controlling the character-selecting components of each group and embodying an automatic controlling-switch having a variable throw the length of which is determined by the time constant of each signal component of a code having signals of different lengths for various positions of a cod character.

20. A receiving telegraph instrument comprising in combination with a plurality of character-recording devices; the following complementary elements, viz.—groups of differential character-selecting components corresponding in number to the maximum number of signal components of any of the code characters representing said recording devices, and a group-selector—one of which elements is controlled by the signal components; and component-selecting means controlling the character-selecting components of each group and embodying an automatic oscillatory controlling-switch movable from a zero-point through arcs of different lengths determined by the time constants of the respective signal components.

21. A receiving telegraph instrument comprising in combination with a plurality of character-recording devices, groups of differential character-selecting components which groups correspond in number to the maximum number of signal components of any of the code characters representing said recording devices, and a pair of selectors one of which constitutes a group-selector and both of which constitute component-selectors controlling the character-selecting components of each group and which also constitute means for selectively converting each signal of a code having signals of different lengths for various positions of a code character into movements characteristic of the length and position of such signal.

22. A receiving telegraph instrument comprising in combination with a plurality of character-recording devices, groups of differential character-selecting components which groups correspond in number to the maximum number of signal components of any of the code characters representing said recording devices, and a pair of combined group and component selectors governed respectively by signal components of different values to control the character-selecting components of each group and constituting means for selectively converting each signal of a code having signals of different lengths for various positions of a code character into movements characteristic of the length and position of such signal.

23. A receiving telegraph instrument comprising in combination with a plurality of character-recording devices, groups of differential character-selecting components which groups correspond in number to the maximum number of signal components of any of the code characters representing said recording devices, and a pair of combined group and component selectors having a common group-selecting position and also having different individual movements controlling the character-selecting components of each group and governed respectively by signal components of different values and constituting means for selectively converting each signal of a code having signals of different lengths for various positions of a code character into movements characteristic of the length and position of such signal.

24. A receiving telegraph instrument comprising in combination with a plurality of character-recording devices, groups of differential character-selecting components which groups correspond in number to the maximum number of signal components of any of the code characters representing said recording devices, a carrier supporting said character-selecting components and having a group-selecting movement controlled by each of said signal components, and a pair of component-selectors adjacent to the path of movement of said carrier and coöperative therewith and controlling the character-selecting components of each group and governed respectively by signal components of different values and constituting with said carrier means for selectively converting each signal of a code having signals of different lengths for various positions of a code character into movements characteristic of the length and position of such signal.

25. A receiving telegraph instrument comprising in combination with a plurality of character-recording devices, groups of differential character-selecting components which groups correspond in number to the maximum number of signal components of any of the code characters representing said recording devices, a carrier supporting said character-selecting components and having a step-by-step group-selecting movement controlled by each of said signal components, and a pair of component-selectors adjacent to the path of movement of said carrier and coöperativs therewith and controlling the character-selecting components of each group and governed respectively by signal components of different values and constituting with said carrier means for selectively converting each signal of a code having signals of different lengths for various positions of a code character into movements characteristic of the length and position of such signal.

26. A receiving telegraph instrument comprising in combination with a plurality of character-recording devices, groups of differential character-selecting components which groups correspond in number to the maximum number of signal components of any of the code characters representing said recording devices, a carrier supporting said character-selecting components and having a step-by-step group-selecting movement controlled by each of said signal components, and a pair of component-selectors mounted to turn about an axis parallel with and adjacent to the path of movement of said carrier and operative selectively to determine the character-selecting component of each group and governed respectively by signal components of different values.

27. A receiving telegraph instrument comprising in combination with a plurality of character-recording devices, groups of character-selecting stops of different lengths said groups corresponding in number to the maximum number of signal components of any of the code characters representing said recording devices, a stop-carrier having step-by-step group-selecting movements controlled by each of said signal components, and a pair of stop-selecting feed devices mounted to turn about an axis parallel with and adjacent to the path of movement of said carrier and controlling the stops of each group and governed respectively by signal components of different values.

28. A receiving telegraph instrument comprising in combination with a plurality of character-recording devices, groups of character-selecting stops of different lengths said groups corresponding in number to the maximum number of signal components of any of the code characters representing said recording devices, a stop-carrier having a step-by-step group-selecting movement controlled by each of said signal components, a pair of stop-selecting feed devices normally movable in unison about an axis parallel with and adjacent to the path of movement of said carrier and controlling the stops of each group and governed respectively by signal components of different values, and means controlled by one of said signal components for changing the relation of said feed devices.

29. A receiving telegraph instrument comprising in combination with a plurality of character-recording devices, groups of character-selecting stops of different lengths said groups corresponding in number to the maximum number of signal components of any of the code characters representing said recording devices, a stop-carrier having a step-by-step group-selecting movement controlled by each of said signal components, a pair of stop-selecting feed devices normally movable in unison about an axis parallel with and adjacent to the path of movement of said carrier and controlling the stops of each group and governed respectively by signal components of different values, and means controlled by one of said signal components for changing the angular relation of said feed devices about said axis.

30. A receiving telegraph instrument comprising in combination with a plurality of character-recording devices, groups of character-selecting stops of different lengths said groups corresponding in number to the maximum number of signal components of any of the code characters representing said recording devices, a stop-carrier having a step-by-step group-selecting movement controlled by each of said signal components, a pair of stop-selecting feed devices normally coupled for movement in unison about an axis parallel with and adjacent to the path of movement of said carrier and controlling the stops of each group and governed respectively by signal components of different values, and uncoupling means controlled by one of such signal components for changing the angular position of one of said feed devices with respect to the other.

31. A receiving telegraph instrument comprising in combination with a plurality of character-recording devices, character-selecting components corresponding in number to the maximum number of signal components of any of the code characters representing said recording devices, a two-movement carrier supporting said character-selecting components and controlled by each signal of a code having signals of different lengths for various positions of a code character one of its movements being controlled by the position of each of said signal components and controlling the selection of corresponding character-selecting components, and a feed device coöperative with said carrier and its components and controlled by the other movement thereof.

32. A receiving telegraph instrument comprising in combination with a plurality of character-recording devices, groups of differential character-selecting components which groups correspond in number to the maximum number of signal components of any of the code characters representing said recording devices, a carrier supporting said character-selecting components and controlled by each signal of a code having signals of different lengths for various positions of a code character and having a group-selecting movement controlled by each of said signal components and also having a second movement, and a pair of feed devices adjacent to and controlled by the other movement of said carrier and its components and also governed respectively by signal components of different values.

33. A receiving telegraph instrument comprising in combination with a plurality of character-recording devices, groups of differential character-selecting components which groups correspond in number to the maximum number of signal components of any of the code characters representing said recording devices, a carrier supporting said character-selecting components and having a step-by-step axially-reciprocatory group-selecting movement controlled by each of said signal components and also having a turning movement about said axis, and a pair of feed devices mounted to turn about the axis of said carrier and controlled by the turning movement of the carrier and its components and also governed respectively by signal components of different values.

34. A receiving telegraph instrument comprising in combination with a plurality of character-recording devices, groups of differential character-selecting components corresponding in number to the maximum number of signal components of any of the code characters representing said recording devices, a carrier supporting said character-selecting components and having a step-by-step axially-reciprocatory group-selecting movement controlled by each of said signal components and also having an intermittent variable rotary movement about said axis, and a pair of feed devices mounted to turn about the axis of said carrier and controlled by the turning movement of the carrier and its components and also governed respectively by signal components of different values.

35. A receiving telegraph instrument comprising in combination with a plurality of character-recording devices, character-selecting components corresponding in number to the maximum number of signal components of any of the code characters representing said recording devices, a carrier supporting said character-selecting components and having a movement controlled by each signal component of a code having signals for various positions of a code character, and a feed device having a movement reciprocal to that of the carrier and controlling the selection of character-selecting components corresponding to said signal components.

36. A receiving telegraph instrument comprising in combination with a plurality of character-recording devices, character-selecting components corresponding in number to the maximum number of signal components of any of the code characters representing said recording devices, a carrier supporting said character-selecting components and having a variable movement controlled by each of said signal components, and a feed device having a variable movement reciprocal to that of the carrier and controlling the selection of character-selecting components corresponding to said signal components.

37. A receiving telegraph instrument comprising in combination with a plurality of character-recording devices, character-selecting components corresponding in number to the maximum number of signal components of any of the code characters representing said recording devices, a carrier supporting said character-selecting components and having an intermittent rotary movement controlled by each of said signal components, and a feed device also having an intermittent rotary movement reciprocal to that of the carrier and controlling the selection of character-selecting components corresponding to said signal components.

38. A receiving telegraph instrument comprising in combination with a plurality of character-recording devices, character-selecting components corresponding in number to the maximum number of signal components of any of the code characters representing said recording devices, a carrier supporting said character-selecting components and having an intermittent rotary movement controlled by each of said signal components, and a feed device also having an intermittent rotary movement about the axis of the carrier reciprocal to that of the carrier and controlling the selection of character-selecting components corresponding to said signal components.

39. A receiving telegraph instrument comprising in combination with a plurality of character-recording devices, character-selecting components corresponding in number to the maximum number of signal components of any of the code characters representing said recording devices, a carrier supporting said character-selecting components and having an intermittent rotary movement determined by said character-selecting components respectively, a feed device also having an intermittent rotary movement reciprocal to that of the carrier, driving means normally tending to rotate said carrier and feed device, and an escapement controlled by said signal components and controlling the movements of said carrier and feed device.

40. A receiving telegraph instrument comprising in combination with a plurality of character-recording devices, character-selecting components corresponding in number to the maximum number of signal components of any of the code characters representing said recording devices, a carrier supporting said character-selecting components and having an intermittent rotary movement determined by said character-selecting components respectively, a feed device also having an intermittent rotary movement reciprocal to that of the carrier, driving means normally tending to rotate said carrier and its feed device, and an escapement controlled by the makes and breaks of the circuit to the instrument and controlling the movements of said carrier and feed device.

41. A receiving telegraph instrument comprising in combination with a plurality of character-recording devices, groups of differential character-selecting components which groups correspond in number to the maximum number of signal components of any of the code characters representing said recording devices, a carrier supporting said character-selecting components and having a movement controlled by each of said signal components, and a pair of differential feed devices each movable reciprocally to said carrier and each controlling the selection of character-selecting components corresponding to said signal components said feed devices being governed respectively by signal components of different values.

42. A receiving telegraph instrument comprising in combination with a plurality of character-recording devices, groups of differential character-selecting components which groups correspond in number to the maximum number of signal components of any of the code characters representing said recording devices, a carrier supporting said character-selecting components and having a group-selecting movement controlled by the position of each signal component of a code having signals of different lengths for various positions of a code character and also having a feed movement transverse to said first movement and controlled by the length of each signal component, and a pair of differential feed devices controlling the character-selecting components of each group and governed respectively by signal components of different values and each movable reciprocally to said carrier.

43. A receiving telegraph instrument comprising in combination with a plurality of character-recording devices, groups of differential character-selecting components which groups correspond in number to the maximum number of signal components of any of the code characters representing said recording devices, a carrier supporting said character-selecting components and having an axially-reciprocatory group-selecting movement controlled by the position of each signal component of a code having signals of different lengths for various positions of a code character and also having a variable intermittent rotary movement controlled by signal components of different values, and a pair of intermittently-rotative feed devices controlling the character-selecting components of each group and governed respectively by signal components of different values the intermittent rotation of each being reciprocal to that of the carrier.

44. A receiving telegraph instrument comprising in combination with a plurality of character-recording devices, groups of differential character-selecting components which groups correspond in number to the maximum number of signal components of any of the code characters representing said recording devices, a carrier supporting said character-selecting components and having an axially-reciprocatory group-selecting movement controlled by the position of each signal component of a code having signals of different lengths for various positions of a code character and also having a variable intermittent rotary movement controlled by signal components of different values, a pair of differential intermittently-rotative feed devices controlling the character-selecting components of each group and governed respectively by signal components of different values the intermittent rotation of each being reciprocal to that of the carrier, driving means normally tending to rotate said carrier and feed devices, and an escapement controlled by said signal components and controlling the rotation of said carrier and feed devices.

45. A receiving telegraph instrument comprising variably-movable driven means, and means controlled by electrical signals of three or more different values at the receiving-point of the instrument for determining the respective movements of said driven means and causing them to correspond in time and length to the corresponding factors of said signals.

46. A receiving telegraph instrument comprising a variably-movable driven member, and means controlled by electrical signals of three or more different values at the receiving-point of the instrument for determining the respective movements of said driven member and causing them to correspond in time and length to the corresponding factors of said signals.

47. A receiving telegraph instrument comprising driving means, variably-movable driven means, and a coupling device controlled by electrical signals of three or more different values at the receiving-point of the instrument and controlling selectively the respective movements of said driven member.

48. A receiving telegraph instrument comprising driving means, a variably-movable driven member, and a coupling device having a variable coupling period controlled by electrical signals of three or more different values at the receiving-point of the instrument.

49. A receiving telegraph instrument comprising a plurality of character-indicating devices, and a translating-receiver common to said devices and controlling them selectively in accordance with the combinations of receiver-influencing signals representing their respective code characters and having means for selectively converting each signal of a code having signals of different lengths for various positions of a code character into movements characteristic of the length and position of such signal—said receiver embodying a driving member, a variably-movable driven member, and a coupling device having a variable coupling period controlled by and corresponding to the lengths of said signals.

50. A receiving telegraph instrument controlled by the makes and breaks of an electric circuit and comprising a pair of variably-movable driven members controlled respectively by the makes and breaks of the circuit and each having three or more different movements controlling different operations of said instrument, and means controlled by makes and breaks of different values for determining the selection of said driven members and the extent of movement thereof.

51. A receiving telegraph instrument controlled by the makes and breaks of an electric circuit and comprising driving means, a pair of reciprocally-operative variably-movable driven members controlled respectively by the makes and breaks of the circuit and each having three or more different movements controlling different operations of said instrument, and coupling means having variable coupling periods controlled by makes and breaks of different lengths for determining the selection of said driven members and the extent of movement thereof.

52. A receiving telegraph instrument controlled by the makes and breaks of an electric circuit and comprising a continuously-rotative driver, a pair of intermittently-rotative reciprocally-operative driven members, and a coupling device rotatable in unison with said driver and having axially-reciprocatory coupling movements controlled by said makes and breaks and controlling said driven members.

53. A receiving telegraph instrument controlled by the makes and breaks of an electric circuit and comprising a continuously-rotative driver, a pair of intermittently-rotative reciprocally-operative driven members, and a coupling device having axially-reciprocatory coupling movements controlled respectively by said makes and breaks and controlling said driven members and also rotatable in unison with said driver the length of each coupling period corresponding to the length of the make or break in the circuit.

54. A receiving telegraph instrument comprising a plurality of character-indicating devices, a translating-receiver common to said devices and controlling them selectively in accordance with the combinations of receiver-influencing signals representing their respective code characters and having means for selectively converting each signal of a code having signals of different lengths for various positions of a code character into movements characteristic of the length and position of such signal—said receiver embodying a continuously-rotative driver, a pair of intermittently-rotative driven members, and a coupling device rotative in unison with said driver and having variable coupling movements controlled by the makes and breaks in the circuit to the instrument.

55. A receiving telegraph instrument comprising a plurality of character-indicating devices, a pair of selectors controlled respectively by the makes and breaks in the circuit to the instrument and each having three or more variable movements corresponding to the lengths of said respective makes and breaks, and a plurality of devices controlled by said selectors and controlling said character-indicating devices.

56. A receiving telegraph instrument comprising a plurality of character-indicating devices, a pair of selectors controlled respectively by the makes and breaks in the circuit to the instrument and each having three or more variable movements corresponding to the lengths of said respective makes and breaks, a series of devices controlled by that selector which is governed by makes of different lengths, and separate means controlled by that selector which is governed by breaks of different lengths.

57. A receiving telegraph instrument comprising a plurality of character-indicating devices, a pair of reciprocally-operative controlling-switches governed respectively by makes and breaks in the circuit to the instrument and also having variable movements corresponding to the lengths of said respective makes and breaks, two rows of contacts governed respectively by said switches, and a plurality of electric circuits controlled by said contacts and controlling said character-indicating devices.

58. A receiving telegraph instrument comprising a plurality of character-indicating devices, a selector controlled by each signal of a code having signals of different lengths for various positions of a code character said selector having three or more variable movements corresponding to the lengths of the signals received by the instrument, and a plurality of devices controlled by said selector and controlling said character-indicating devices.

59. A receiving telegraph instrument comprising a plurality of character-indicating devices, a selector controlled by each signal of a code having signals of different lengths for various positions of a code character said selector having three or more variable movements corresponding to the lengths of the signals received by the instrument, and a plurality of character-selecting components controlling said character-indicating devices and controlled respectively by the different movements of said selector.

60. A receiving telegraph instrument comprising a plurality of character-indicating devices, a selector controlled by each signal of a code having signals of different lengths for various positions of a code character said selector having three or more variable movements corresponding to the lengths of the signals received by the instrument, a plurality of character-selecting components controlled by the shortest two movements of said selector and controlling those character-indicating devices which have corresponding signal components, and means controlled by a longer movement of said selector for governing another of said character-indicating devices.

61. A receiving telegraph instrument comprising a plurality of character-indicating devices, a selector controlled by each signal of a code having signals of different lengths for various positions of a code character said selector having three or more variable movements corresponding to the lengths of the signals received by the instrument, a plurality of character-selecting components controlled by the shortest two movements of said selector and controlling those character-indicating devices which have corresponding signal components, and means controlled by longer movements of said selector for governing respectively others of said character-indicating devices.

62. A receiving telegraph instrument comprising a plurality of character-indicating devices, a pair of selectors controlled respectively by the makes and breaks in the circuit to the instrument and having three or more variable movements corresponding to the lengths of said respective makes and breaks the makes being of different lengths for various positions of a code character, a plurality of character-selecting components controlled by the shortest two movements of its selector and controlling movements of said character-indicating devices, and spacing means controlled by the other selector.

63. A receiving telegraph instrument comprising a plurality of character-indicating devices, a pair of selectors controlled respectively by the makes and breaks in the circuit to the instrument and having three or more variable movements corresponding to the lengths of said respective makes and breaks the makes being of different lengths for various positions of a code character, a plurality of character-selecting components controlled by the shortest two movements of its selector and controlling movements of said character-indicating devices, and a plurality of differential spacing devices controlled by the respective movements of said other selector.

64. A receiving telegraph instrument comprising a plurality of character-indicating devices, a pair of selectors controlled respectively by the makes and breaks in the circuit to the instrument and having three or more variable movements corresponding to the lengths of said respective makes and breaks one of said selectors being controlled by makes of different lengths for various positions of a code character and controlling the operation of the character-indicating devices, and a plurality of devices controlled respectively by the movements of the other selector.

65. A receiving telegraph instrument comprising a plurality of character-indicating devices, a pair of selectors controlled respectively by the makes and breaks in the circuit to the instrument and having three or more variable movements corresponding to the lengths of said respective makes and breaks, one of said selectors being controlled by makes of different lengths for various positions of a code character and controlling the operation of the character-indicating devices, and a plurality of differential spacing devices controlled respectively by the different movements of the other selector.

66. A receiving telegraph instrument comprising a plurality of character-indicating devices, a pair of selectors controlled respectively by the makes and breaks in the circuit to the instrument and having three or more variable movements corresponding to the lengths of said respective makes and breaks, one of said selectors being controlled by makes of different lengths for various positions of a code character and controlling the operation of the character-indicating devices, and printing and spacing devices controlled respectively by the different movements of the other selector.

67. A receiving telegraph instrument comprising a plurality of character-indicating devices, groups of differential character-selecting components which groups correspond in number to the maximum number of makes of the circuit to the instrument for any of the code characters representing said character-indicating devices, and a pair of selectors one of which is controlled by makes of different lengths for various positions of a code character and has variable movements corresponding to the lengths of said makes and controlling the character-selecting components of each group and the other of which is controlled by the breaks in the circuit and controls the selection of said groups.

68. A receiving telegraph instrument comprising driving means normally continuously operative, a selector having a variable movement controlled by said driving means and corresponding in length to the lengths of the signals received by the instrument, and means controlled by an abnormal movement of said selector for stopping the operation of said driving means.

69. A receiving telegraph instrument comprising an electric motor normally continuously rotative, a selector having a variable movement controlled by said motor, and corresponding in length to the lengths of the signals received by the instrument, and means controlled by an abnormal movement of said selector for breaking the motor-circuit.

70. A receiving telegraph instrument controlled by the makes and breaks in the circuit thereto and comprising an electric motor normally continuously rotative, a selector operable by said motor and having a variable movement controlled by one of said circuit components and corresponding in length to the length of such circuit component, and means controlled by an abnormal movement of said selector for breaking the motor-circuit.

71. A receiving telegraph instrument controlled by the makes and breaks in the circuit thereto and comprising an electric motor normally continuously rotative, a series of contacts, electrically-controlled devices governed thereby, a switch operable by said motor and having a variable movement controlling said contacts selectively and controlled by one of said circuit components and corresponding in length to the length of such circuit component, and means controlled by an abnormal movement of said switch for breaking the motor-circuit.

72. A receiving telegraph instrument comprising a plurality of character-indicating devices, groups of differential character-selecting components corresponding in number to the maximum number of makes of the circuit to the instrument for any of the code characters representing said character-indicating devices, a series of contacts governing the selection of the respective components of each group and also governing the selection of one or more miscellaneous character-indicating devices, a second series of contacts governing the selection of said groups, and a pair of switches one of which is controlled by the makes of the circuit and has variable movements corresponding to the lengths of said makes and controls said first series of contacts and the other of which is controlled by the breaks in the circuit and controls the other series of contacts.

73. A receiving telegraph instrument com prising a plurality of character-recording devices, groups of differential character-selecting components corresponding in number to the maximum number of makes of the circuit to the instrument for any of the code characters representing said character-recording devices, a series of contacts governing the selection of the respective components of each group and also governing the selection of one or more miscellaneous character-recording devices, a second series of contacts governing the selection of said groups and also governing the recording and spacing of said character-recording devices, and a pair of switches one of which is controlled by the makes of the circuit and has variable movements corresponding to the lengths of said makes and controls said first series of cntacts and the other of which is controlled by the breaks in the circuit and controls the other series of contacts.

74. A receiving telegraph instrument comprising a plurality of character-indicating devices, groups of differential character-selecting components corresponding in number to the maximum number of makes of the circuit to the instrument for any of the code characters representing said character-indicating devices, a component-selector controlling the components of each group, a reciprocatory group-selector having a step-by-step working stroke, and means for returning said group-selector to its normal position after the reception of each code character.

75. A receiving telegraph instrument comprising a plurality of character-indicating devices, groups of differential character-selecting components corresponding in number to the maximum number of makes of the circuit to the instrument for any of the code characters representing said character-indicating devices, a component-selector controlled by the makes of said circuit and controlling the components of each group, a reciprocatory group-selector having a step-by-step working stroke controlled by breaks in said circuit, and means for returning said group-selector to its normal position after the reception of each code character.

76. A receiving telegraph instrument comprising a type-wheel having a series of types, a translating-receiver controlling the selection of said types and operative for turning said wheel different predetermined distances corresponding respectively to the combinations of receiver-influencing signals representing the respective code characters of said types said receiver having means for selectively converting each signal of a code having signals of different lengths for various positions of a code character into two movements one of which is characteristic of the length and the other of which is characteristic of the position of such signal, and means for returning said type-wheel to its normal position after the reception of each code character.

77. A receiving telegraph instrument comprising a plurality of character-indicating devices, an electric motor normally continuously rotative, a translating-receiver common to said devices and controlling them selectively in accordance with the combinations of receiver-influencing signals representing their respective code characters and having means for selectively converting each signal of a code having signals of different lengths for various positions of a code character into movements characteristic of the length and position of such signal said receiver embodying a selector having variable movements controlled by the time constants of the signal components and effected by said motor, and an automatic regulator for maintaining a constant motor speed and a regular rate of movement of said selector.

78. A receiving telegraph instrument comprising a plurality of character-indicating devices, an electric motor normally continuously rotative, a translating-receiver common to said devices and controlling them selectively in accordance with the combinations of receiver-influencing signals representing their respective code characters and having means for selectively converting each signal of a code having signals of different lengths for various positions of a code character into movements characteristic of the length and position of such signal said receiver embodying a selector having variable movements controlled by the time constants of the signal components, and automatic regulating means controlled by the rotation of said motor and controlling the motor-circuit and operative for maintaining a constant motor speed.

79. A receiving telegraph instrument comprising a plurality of character-indicating devices, and a translating-receiver common to said devices and controlling them selectively in accordance with the combinations of receiver-influencing signals representing their respective code characters and having means for selectively converting each signal of a code having signals of different lengths for various positions of a code character into two movements one of which is characteristic of the length and the other of which is characteristic of the position of such signal—said receiver embodying an adding-wheel having variable rotary movements representing the signal components of said code characters.

80. A receiving telegraph instrument comprising a plurality of character-indicating devices, and a translating-receiver common to said devices and controlling them selectively in accordance with the combinations of receiver-influencing signals representing their respective code characters and having means for selectively converting each signal of a code having signals of different lengths for various positions of a code character into movements characteristic of the length and position of such signal—said receiver embodying a pair of selectors controlled respectively by the makes and breaks in the circuit, and a pair of complementary character-selecting feed devices controlled respectively by said selectors.

Signed at Providence, in the county of Providence and State of Rhode Island, this 14th day of April, A. D. 1903.

CHARLES R. UNDERHILL.

Witnesses:
 CHAS. E. ANDERSON,
 WILLIAM H. BALKE.